United States Patent [19]

Ahad et al.

[11] Patent Number: 4,884,725

[45] Date of Patent: Dec. 5, 1989

[54] WATER DISPENSING SYSTEM

[76] Inventors: Munir J. Ahad, 27514 Scyamore Creek Dr., Valencia, Calif. 91355; Sven A. Pettersson, 1227 24th St., Santa Monica, Calif. 90404

[21] Appl. No.: 178,134

[22] Filed: Apr. 6, 1988

Related U.S. Application Data

[62] Division of Ser. No. 929,749, Nov. 12, 1986, Pat. No. 4,784,303.

[51] Int. Cl.$^4$ .............................................. B67D 5/08
[52] U.S. Cl. ..................................... 222/639; 222/145; 222/397; 137/624.11; 4/192; 4/626
[58] Field of Search ............... 222/641, 642, 638, 639, 222/504, 397, 145; 239/70, 29.3; 4/192, 625, 626; 244/118.5; 137/624.11, 636.4; 138/45

[56] References Cited

U.S. PATENT DOCUMENTS

| | | | |
|---|---|---|---|
| 3,530,889 | 9/1970 | Spencer | 137/636.2 X |
| 4,161,965 | 7/1979 | Merritt | 138/45 |
| 4,429,422 | 2/1984 | Wareham | 4/192 |
| 4,606,085 | 8/1986 | Davies | 4/623 |
| 4,784,303 | 11/1988 | Ahad et al. | 222/639 |

Primary Examiner—Joseph J. Rolla
Assistant Examiner—Gregory L. Huson
Attorney, Agent, or Firm—Whann & Connors

[57] ABSTRACT

Disclosed is a water dispensing system for an aircraft wherein hot and cold water supplied to a faucet disposed above a washbasin in a controlled manner including solenoid valves for both the hot and cold water. Two manually operated switches are employed to energize, respectively, the hot and cold solenoid valves. Two different timing cycles are employed. In one timing cycle, when one switch is actuated and then the other switch is actuated within a predetermined time period, both solenoid valves will be turned on to provide approximately equal volumes of water to the faucet for a predetermined time period. In another timing cycle, when one switch is actuated and the other switch is actuated within a predetermined time period, the solenoid valve means energized by the first switch will be turned off and the second solenoid valve will be turned on for a predetermined time period.

2 Claims, 9 Drawing Sheets

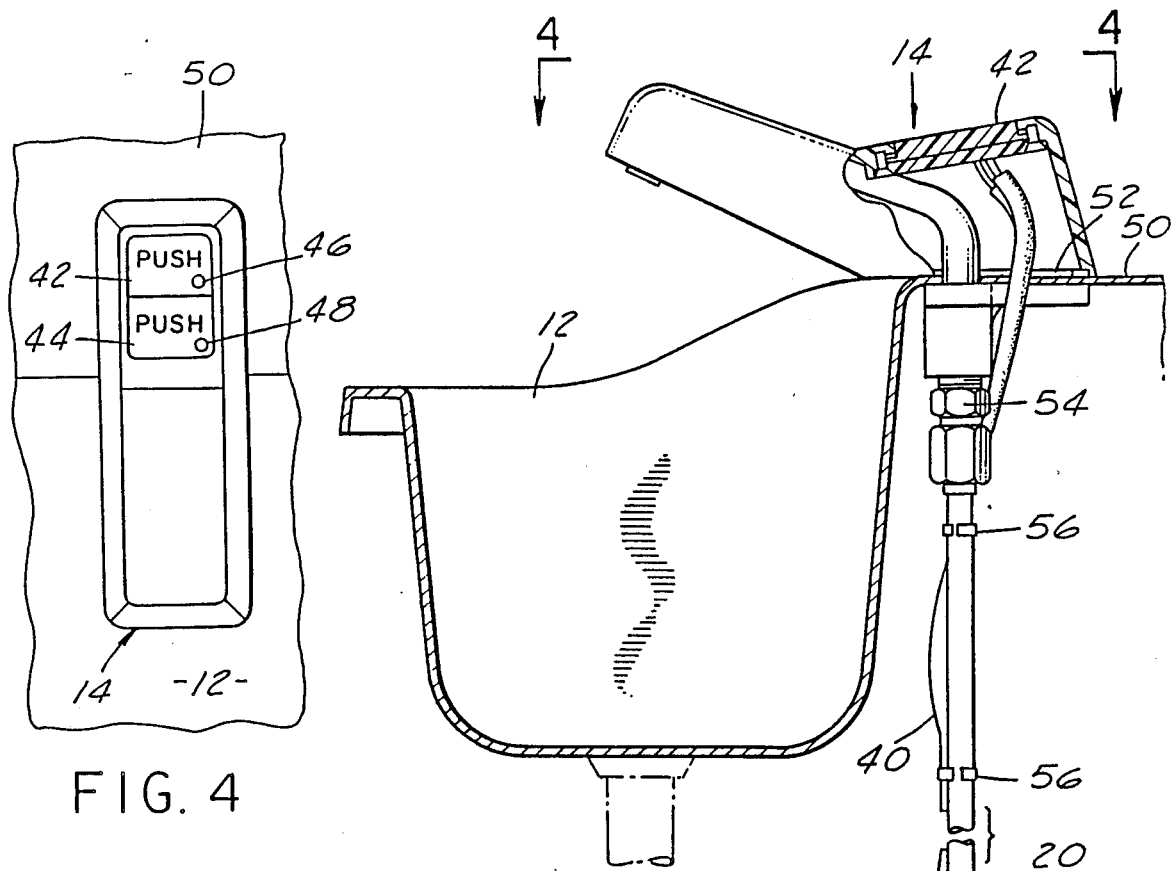
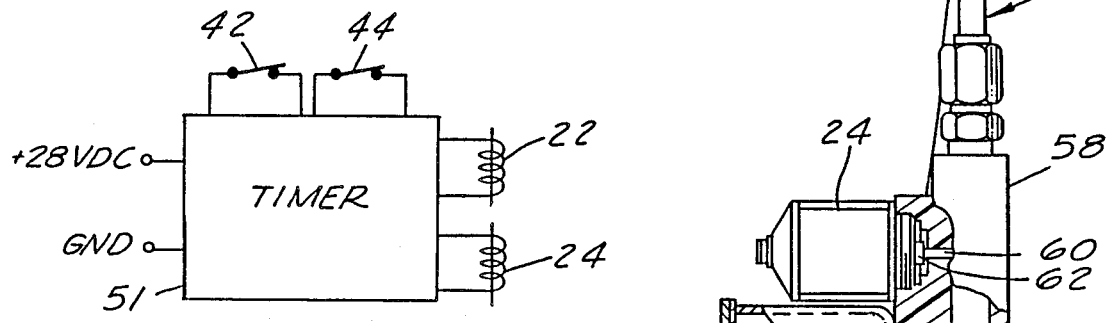
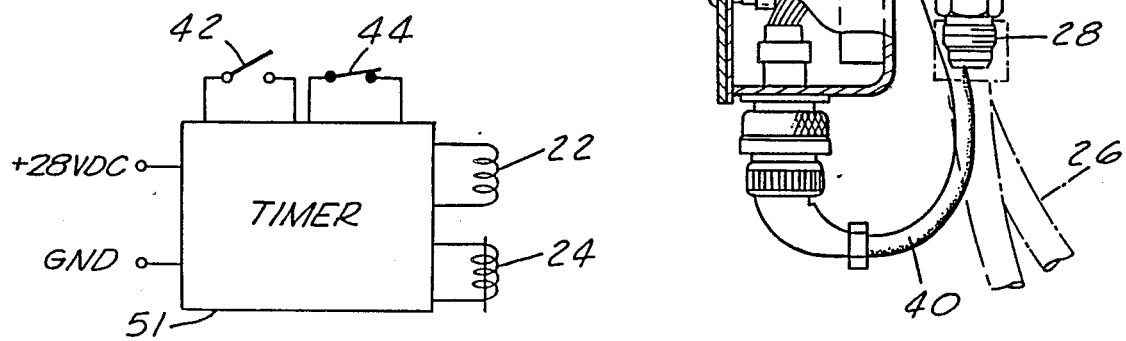
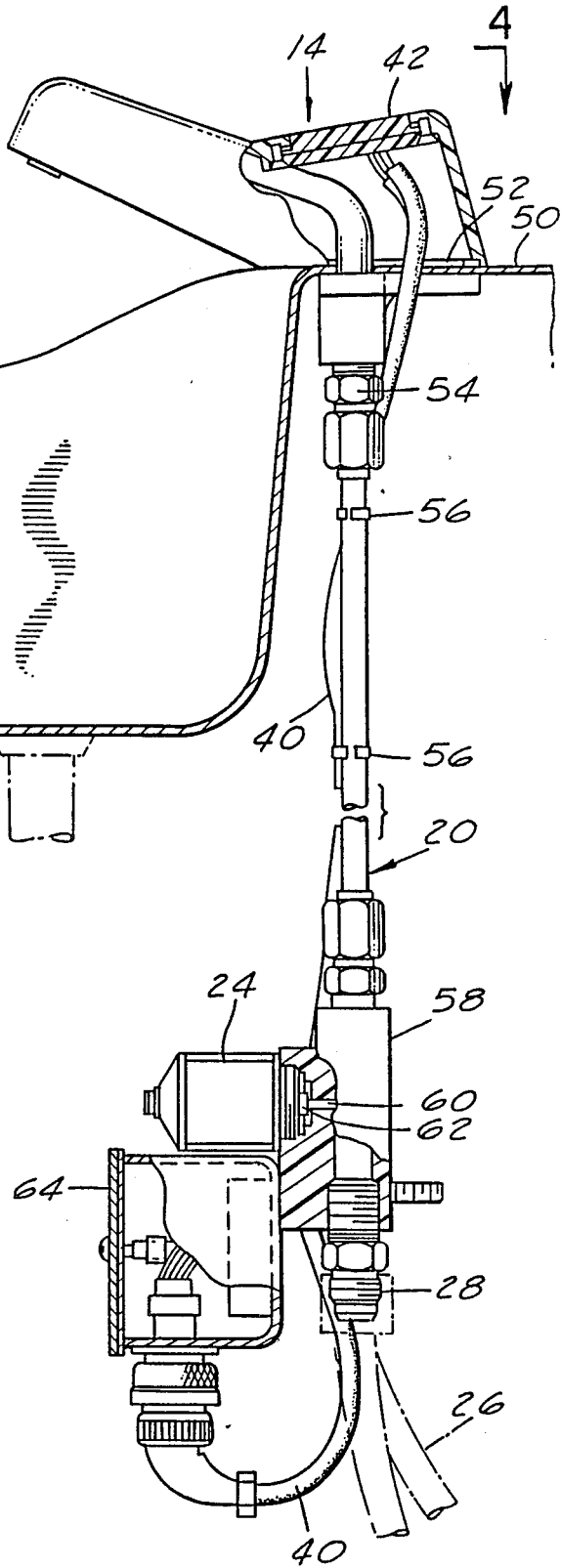
FIG. 4
FIG. 5A
FIG. 5B
FIG. 3

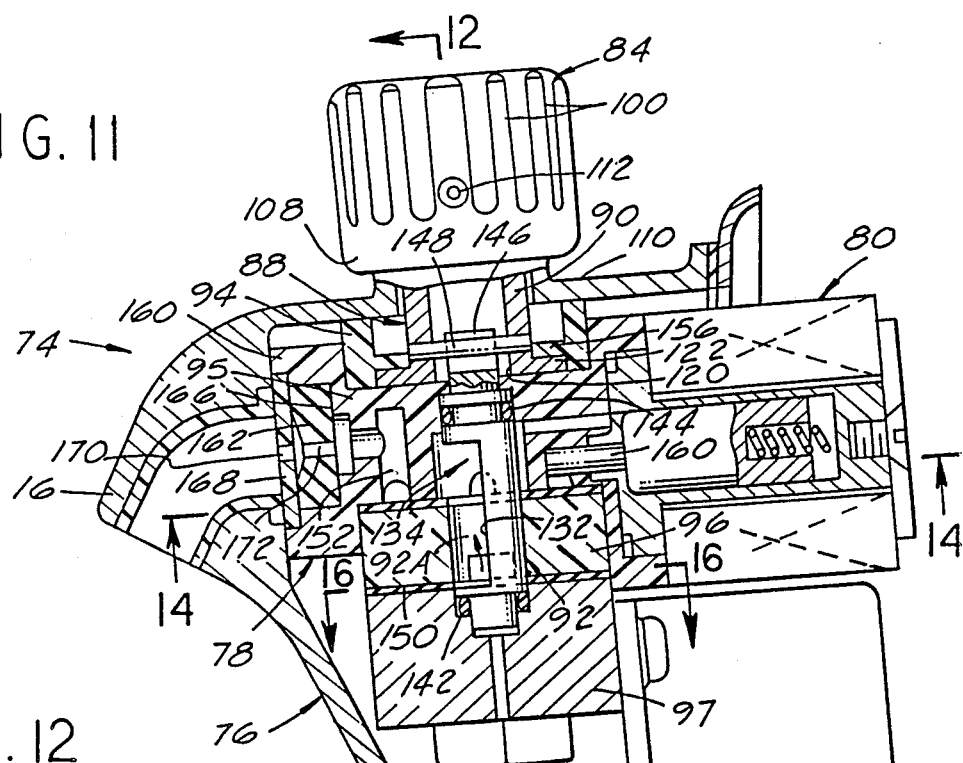

000# WATER DISPENSING SYSTEM

This is a division of application Ser. No. 929,749, filed Nov. 12, 1986, and now U.S. Pat. No. 4,784,303.

BACKGROUND OF THE INVENTION

1. Field of the Invention

This invention relates to a water dispensing system, and particularly a water dispensing system for use in an aircraft and having a faucet-basin combination wherein the control of water flowing from the faucet into the basis is regulated by an electronic timing device.

2. Background Discussion

Water is one of the necessary loads carried by aircraft. In commercial aviation it is particularly desirable to use the minimum amount, yet have sufficient water available to satisfy the requirements of the passengers and crew. One method adopted for conserving the usage of water on board an aircraft, and thus minimizing the amount needed to be carried, is to provide an automatic way for shutting off the faucet in the lavatory of the aircraft. It is conventional practice to employ a mechanical device which, after a predetermined period, will automatically close a valve in the conduit supplying water to the faucet. One such device relies upon capillary action, requiring the use of a small diameter tube to actuate a spring mechanism which closes the valve. One disadvantage of this system is that the tube gets clogged with scale deposits and the faucet does not close as desired.

MAJOR FEATURES OF THE INVENTION

The problem discussed above has been obviated by the present invention which provides a simple and reliable system for dispensing water in a controlled manner. There are several features of this invention, no single one of which is solely responsible for its desirable attributes. Without limiting the scope of this invention, as expressed by the claims, its more prominent features will now be discussed briefly. After considering this discussion, and particularly after reading the section of this patent application entitled DETAILED DESCRIPTION OF THE PREFERRED EMBODIMENTS, one will understand how the features of this invention provide a reliable water dispensing system for an aircraft.

One of the major features of this invention is the use of an electronically controlled solenoid valve in the conduit through which the water flows. The water is maintained under pressure so that, when the solenoid valve is opened, the water will flow through the valve to a faucet disposed above a washbasin. There is a manually operable switch associated with the faucet which, when actuated by the user, energizes the solenoid valve to allow water to flow through the faucet into the basin.

In accordance with a second important feature of this invention, timing control means are provdded so that the valve, upon actuation of the switch, will only be open for a predetermined time period. In one embodiment of this invention, the water supply includes means for delivering hot and cold water to the faucet with the conduits for the hot and cold water each including its own solenoid valve and its own control switch for opening and closing the valve. There are several different timing cycles used to regulate the opening and closing of the solenoid valves. In one, when one switch is actuated and the other is also actuated during said predetermined time period, the timing control means resets the timing cycle so that control solenoids are energized for the same length of time. In this system, the volumes of hot and cold water flowing from the faucet are approximately equal. In another, the timing control means is designed so that, when one switch is actuated to initiate the timing cycle for one solenoid and the other is also actuated during this cycle, the timing cycle is reset to stop the flow of water through the solenoid valve initially energized and start the flow of water through the second solenoid valve for said predetermined time period. Thus one or the other of the valves is open for the desired time period.

In accordance with a third major feature of this invention, the water dispensing system includes a mixing chamber where the hot and cold water are mixed with manually adjustable means for controlling the ratio of hot and cold water being mixed in the chamber In this embodiment, the solenoid valve is between the faucet and the mixing chamber, and upon energization, allows water to flow from the mixing chamber to the faucet. Preferably, in this embodiment, the faucet includes a manually operable control member which is adapted to rotate and also move rectilinearly. This control member upon rotation adjusts the ratio of hot and cold water flowing into the mixing chamber and upon being moved rectilinearly actuates the switch to energize the solenoid valve.

The preferred embodiments of the invention illustrating all of its features will now be discussed in detail. These embodiments show the water dispensing system of this invention being used with either (1) a plurality of solenoid control valves or (2) only a single solenoid control valve. Depending upon the requirements of the aircraft, either may be used.

BRIEF DESCRIPTION OF THE DRAWING

The water dispensing system of this invention is illustrated in the drawing, with like numerals indicating like parts, and in which:

FIG. 3.is a cross-sectional view taken along line 3—3 of FIG. 2.

FIG. 4 is a cross-sectional view taken along line 4—4 of FIG. 3.

FIG. 5B is a control circuit for controlling the timing cycle where one, but not both of the solenoids of the water dispensing system shown in FIG. 2, is actuated.

FIG. 5A is a control circuit for actuating both solenoids shown in FIG. 2 to mix hot and cold water.

FIG. 11 is a cross-sectional view taken along line 11—11 of FIG. 9.

FIG. 12 is a cross-sectional view taken along line 12—12 of FIG. 11.

FIG. 13 is a perspective view of the mixing control element shown in FIG. 11.

DETAILED DESCRIPTION OF THE PREFERRED EMBODIMENT

Figures 1, 2:
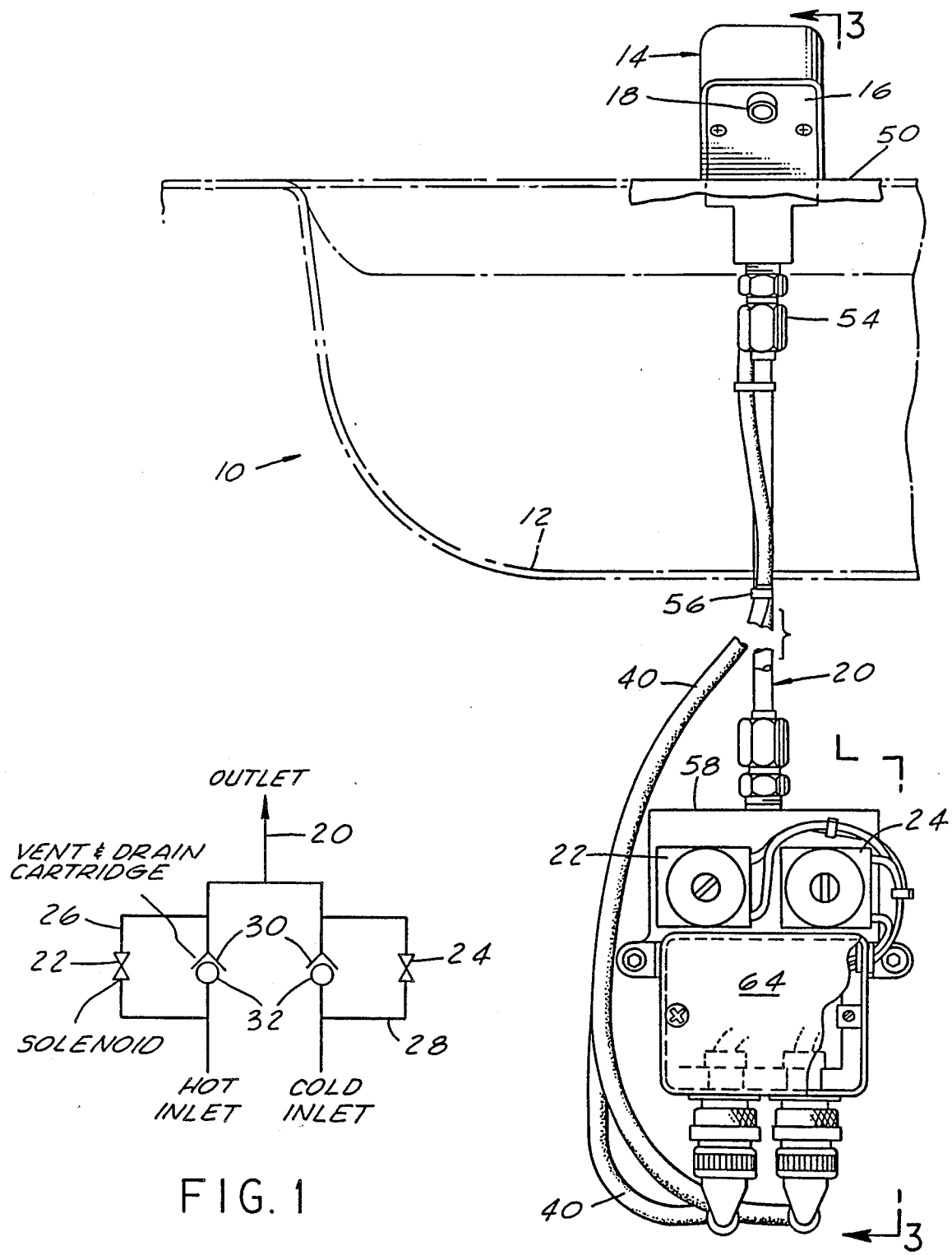
FIG. 1 is a schematic diagram illustrating the hydraulic circuit of the water dispensing system shown in FIG. 2.
FIG. 2 is a front elevational view of the water dispensing system of this invention.

The first embodiment of this invention is shown in FIGS. 1 through 4. In this embodiment the water dispensing system 10 includes a basin 12 and faucet 14 combination with the faucet arranged above the basin with the spout 16 of the faucet over the basin with the opening 18 in the spout positioned so that water flowing from the spout will be caught in the basin. Below the basin is the water supply conduit means 20 including two solenoid control valves 22 and 24, each located separately in a hot water line 26 and a cold water line 28 which are connected through the solenoid valves to the water supply conduit.

As best depicted in FIG. 1, the hydraulic circuit for the water dispensing system 10 is designed so that the solenoid valves 22 and 24 are connected in parallel with each other with the outlets of the solenoids being in common connection with the conduit 20. The inlets of the solenoid valves 22 and 24 are, respectively, connected to the hot and cold water lines 26 and 28. In parallel with each of these solenoid valvesare vent and drain devices 30, schematically depited in FIG. 1 and depicted in detail in FIG.12.

Each device 30 includes a ball 32 which is seated to close off a vent 34 to the atmosphere when the water level causes the ball to float upwardly to engage and be forced into the opening 36 of the vent. Both the hot and cold water lines 26 and 28 are equipped with a device 30 upstream of the solenoid.valves. It is a practice in the aircraft industry, when the aircraft is on the ground, to drain the water and refill the storage vessels on board with fresh water. Since the water is maintained under elevated pressure, for example, appx. 25.0 pounds per square inch, it is necessary to vent the system to the atmosphere to drain it. This is accomplished by simply opening a valve (not shown) to begin to drain water from the storage tank. As this occurs, the ball 32 will move downward with the level of the water, unblocking the vent 34. During filling of the tank, as the water level rises, the ball 32 will float upwardly with the water level until it seats itself in the opening 36 in the vent to close the filter. An "O" ring 38 in each opening 36 provides a seal so water will not leak past the ball seated in the opening. This allows the water in the system to then be pressurized since it is now closed to the atmosphere.

In accordance with one feature of this invention, both the hot and cold water lines 26 and 28 are equipped with solenoid valves so that the flow of hot and cold water can be independently controlled. These solenoid valves are connected electrically by cable 40 to two separate switches 42 and 44 which are located in the top faucet 14, as illustrated in FIG. 3. The switches are of the flexible, lever type and preferably are equipped with light emitting diodes 46 and 48. Each diode is turned on upon actuation of its respective switch. The faucet 14 is secured in position on top of a drainboard 50 with a rubber gasket 52 disposed between the faucet and the top of the board. The faucet 14 preferably is of an aluminum material which has been cast into the desired shape with a hollow interior. The conduit 20 leads upwardly from the solenoid valves 22 and 24 and is secured by a coupling 54 to the faucet 14. The electrical cable 40 for the switches 42 and 44 is secured by clamps 56 to the conduit.

The two solenoid valves 22 and 24 are carried in a plastic block 58 which has a common channel 60 into which the outlets of the solenoid valves are in communication. Whenever a solenoid valve is energized, its plunger 62 is pulled inwardly, allowing water to flow through the valve into the common channel 60, through the block 58, and thence into conduit 20 to the faucet 14. The electronic control box 64 housing the electrical control circuit for the solenoid valves 22 and 24 is mounted to the block 58.

Two different timing cycles are provided for the water dispensing system 10 shown in FIGS. 2 through 4. FIG. 5A shows a circuit where both solenoids may be turned on simultaneously, FIG. 5B shows a control circuit where only one of the two solenoid valves 22 and 24 can be turned on.

Figure 6:
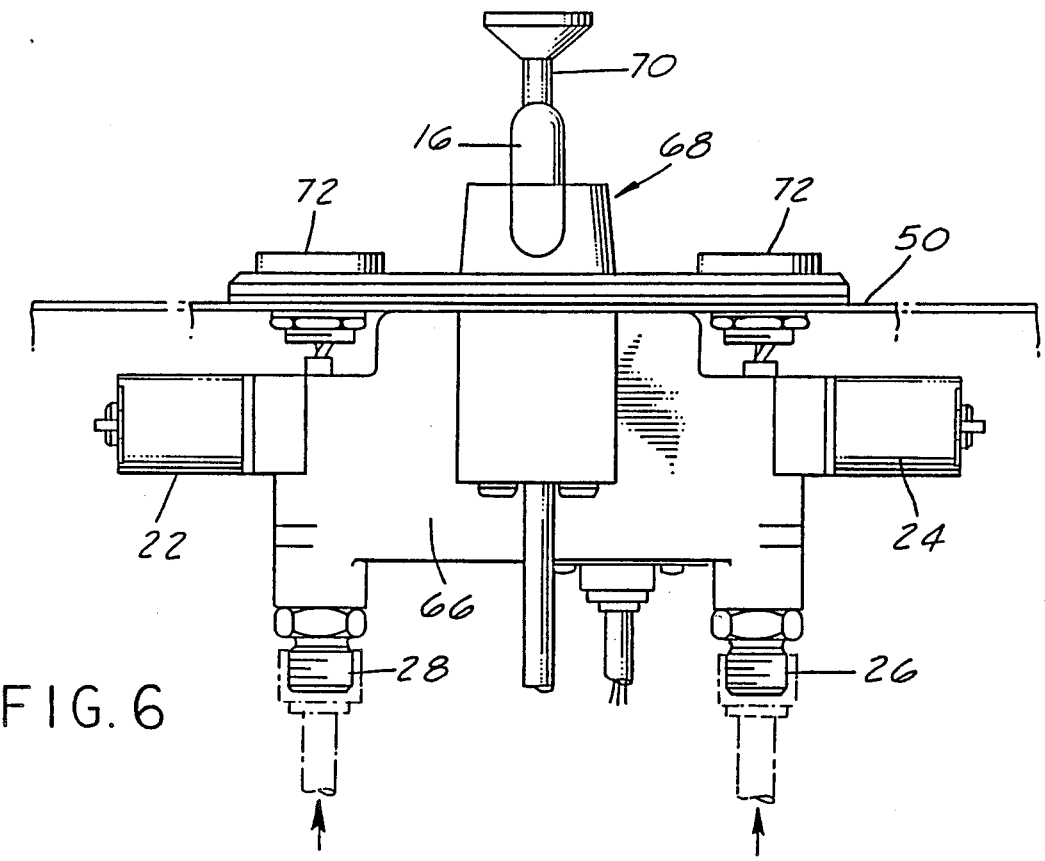
FIG. 6 is a rear elevational view of a second embodiment of this invention using piezo electric switches to actuate the solenoid valves.
Figure 6A:
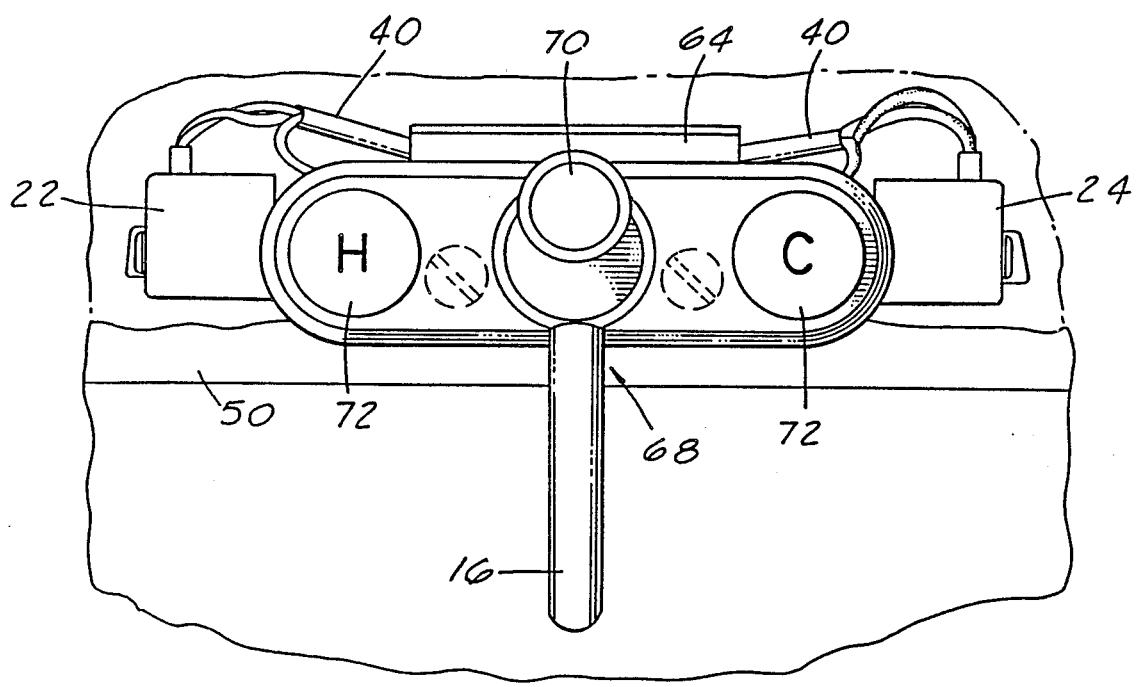
FIG. 6A is a plan view of the water dispensing system shown in FIG 6.
Figure 7:
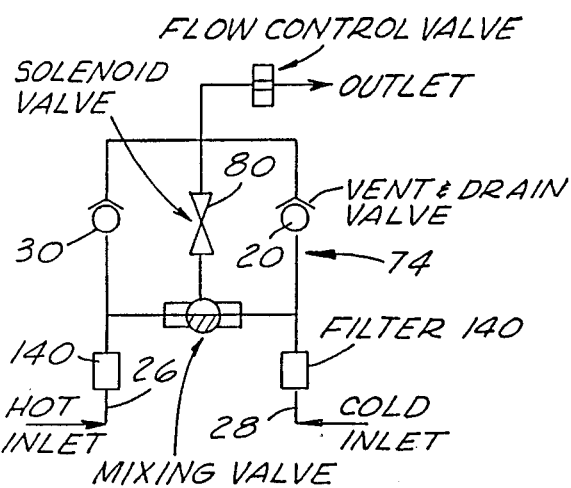
FIG. 7 is a schematic diagram illustrating the hydraulic circuit for the water dispensing system shown in FIGS. 8 through 20.
Figure 9:
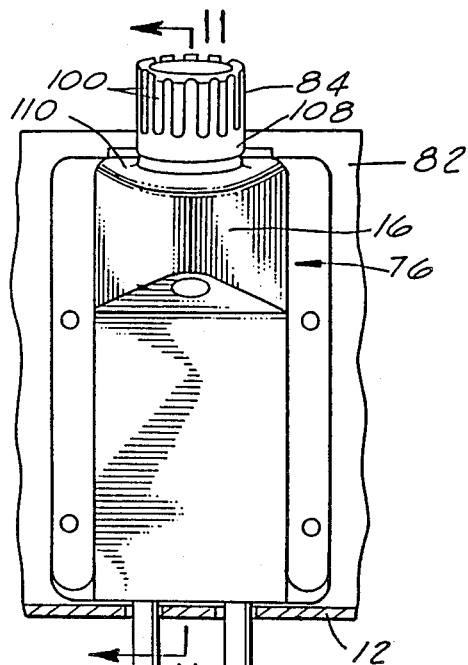
FIG. 9 is a front elevational view of the faucet shown in FIG. 8.

FIG. 6 shows a second embodiment of this invention wherein the two solenoids 22 and 24 are carried by a mounting assembly 66 mounted immediately below the drainboard 50, with the faucet 68 attached to this mounting assembly which includes a conventional drain control mechanism 70 for opening and closing the drain (not shown) in the basin. The vent and drain devices 30 are housed in this mounting assembly 66. This mounting assembly 66 includes a common outlet (not shown) to which the two solenoid valves are connected. The solenoid valves 22 and 24 and device 30 are arranged in the same hydraulic circuit as shown in FIG. 1. Each of the solenoid valves 22 and 24 is electrically connected to a piezo electric switch 72 which, when actuated, energizes the solenoid of the valve. Each of these piezo electric switches 72 are mounted on opposite sides of the spout 16 of the faucet 68, with the mounting assembly 66 being directly below the switches and the respective solenoids carried on opposite sides of the assembly adjacent their respective switches. The control box 64 containing the control circuitry is mounted on the rear wall of the assembly 66, with the cables 40 for the switches 72 and solenoid valve 22 and 24 extending outwardly from the sides of the block, respectively, connected to the solenoid valves and the switches. This arrangement is more compact than the embodiment shown in FIGS. 2, 3 and 4 and, therefore, offers this advantage.

The third embodiment of this invention is illustrated in FIGS. 7 through 15. It provides a water dispensing system 74 which allows for adjustment of the ratio of hot and cold water and automatic control of the flow of water by a single electronically operated solenoid valve. As in the other embodiments, this embodiment includes a faucet 76 and basin 12 in combination.

Figure 10:
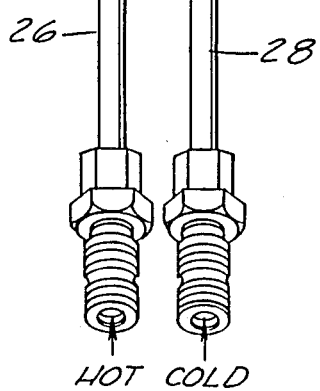
FIG. 10 is a cross-sectional view taken along line 10—10 of FIG. 8.
Figure 8:
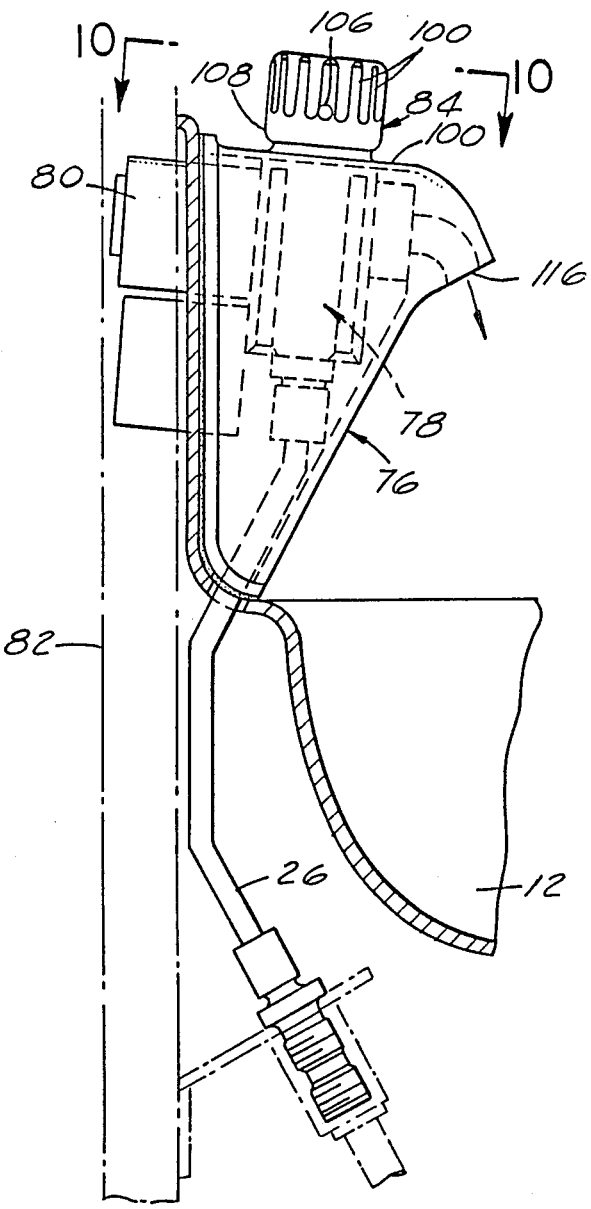
FIG. 8 is a side, elevational view of a third embodiment of this invention.

As best shown in FIGS. 10 and 12, the faucet 76 is made from cast aluminum and has a hollow interior in which is seated the mechanical and electronic control mechanism 78 for controlling the flow of water and ratio of hot and cold water in such flow. Hot and cold water are fed to the faucet 76, respectively, through lines 26 and 28 with water flowing from the spout 16 of the faucet 76 under the control of an electronically operated solenoid valve 80. The control circuit for the valve 80 is located in a control box 64 mounted to a rear wall 82 carrying the basin 12.

On the top of the faucet 76 is a control knob 84 which is manually manipulated to adjust the ratio of hot and cold water. Pushing the knob 84 actuates a switch 86 seated inside the control knob. The control knob 84 is carried on a yoke mechanism 88 including an annular bushing 90 and a mixing control element 92. This yoke mechanism 88 is mounted in four blocks 94-97 seated inside the hollow faucet 76. These blocks 94-97 are designated, respectively, as the header block 94, the water channel block 95, the mixing chamber block 96, and the base block 97.

The control knob 84 is made from plastic and has ribs 100 on its exterior. It has a generally cylindrical configuration with its interior hollowed out to form a bore 102. Midway down the sidewall of the control knob are two oppositedly opposed holes 104 and 106. The lower edge 108 of the control knob 84 has an annular configuration with the edge serving as a stop which engages the top surface 110 of the faucet housing when the control knob 84 is pressed downwardly. Seated in the holes are screws 112 which bear against a ball 114. A coiled spring 116 is lodged in the interior of the bore 102.

The annular bushing 90 has a hollow interior with two open ends 118 and 120. There is a flange 122 surrounding the end 120 and this flange rests against the top of the water channel block 95. At the upper end 118 of the bushing 90 are two opposed slots 124 which receive the balls 114 carried in the control knob 84. When the knob 84 is depressed downwardly, these balls 114 ride along the slots 124. The spring 116 is also depressed and, upon release of the knob 84, will force the control knob to its normal position shown in FIG. 12. The upper end 118 of the bushing carries a switch 126, with the switch actuator 126A bearing against the top inside wall 128 of the bore 102. When the control knob 84 is depressed, the switch actuator 126A is depressed to turn on the solenoid 80. Release of the control knob 84 automatically shuts off the switch with the return of the control knob to its normal position shown in FIG. 12. The cable 130 for the switch is passed through the faucet housing and connected to the control box 64.

Figures 14, 15, 16, 17, 18, 19:
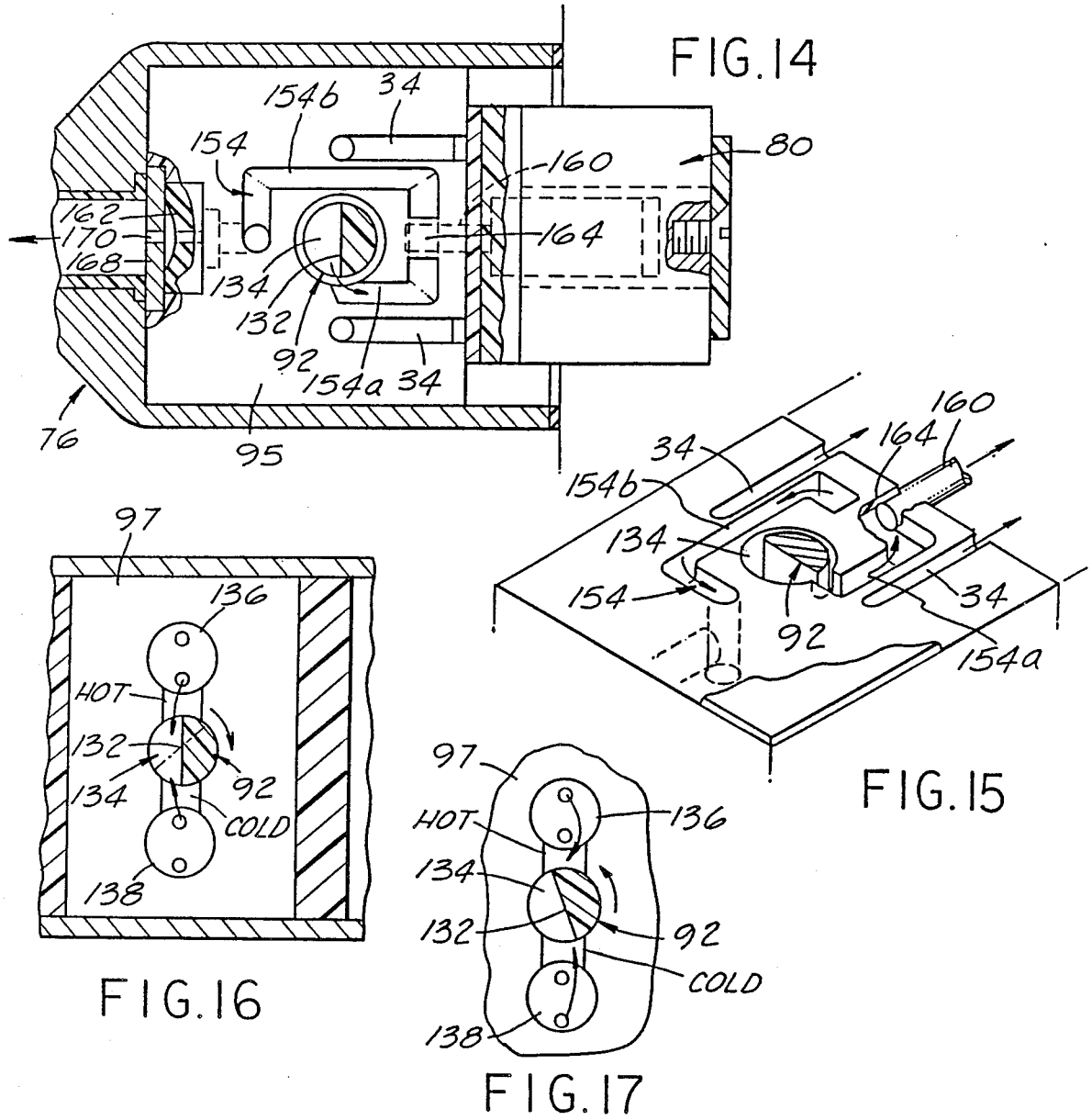
FIG. 14 is a cross-sectional view taken along line 14—14 of FIG. 11.
FIG. 15 is a perspective view of the water channel block, showing its underside carrying the water exit channel.
FIG. 16 is a cross-sectional view taken along line 16—16 of FIG. 11, showing the mixing control element positioned to allow equal amounts of hot and cold water into the mixing chamber.
FIG. 17 is a cross-sectional view similar to that shown in FIG. 16 with the mixing control elements in a partially closed position to allow more cold than hot water to enter the mixing chamber.
FIG. 18 is an enlarged cross-sectional view of the flow control valve in a position where the water pressure
FIG. 19 is an enlarged cross-sectional view of the flow control valve in a second position where the water pressure is high.

The four blocks 94-97 are stacked together and fit snugly inside the faucet housing, with the central position of each of these blocks having a drilled out portion that accommodates the mixing control element 92. This mixing control element 92 has a generally cylindrical configuration with the central portion 92A of it cut away so that the space between the flat wall 132 of this portion 92A and the adjacent walls of the blocks 94 and 96 form a mixing chamber 134. This is best shown in FIGS. 16 and 17 which shows the hot and cold water inlets 136 and 138 for the mixing chamber. There are filters 140 at these inlets 136 and 138.

The mixing control element 92 has one end abutting the cavity in the base block 97, with an O-ring 142 surrounding this end that seals the element so that water does not leak past it. The upper end of the mixing element 92 also has surrounding it an O-ring 144 which seals off this end. At the top of the mixing element is a finger member 146 in which is seated a pin 148 that extends crosswise and is integral with the inside wall of the annular bushing 90. Thus, when the control knob 84 is rotated, the pin 148 bears against the finger member 146. the finger member 146 has a space between its fingers which permits the pin 148 to fit therein. Thus, when properly seated, it allows the control knob 84 to be rotated in either a counterclockwise or clockwise direction to adjust the ratio of hot and cold water.

The mixing element is assembled with the blocks inside the faucet housing to provide the yoke mechanism 88 for moving the mixing control element rectilinearly towards and away from the faucet housing and also rotating in either direction to control the relative position of the mixing element with respect to the hot/cold water inlets 136 and 138.

This aspect of the invention can better be understood in connection with FIGS. 11 and 15. The base block 97 has a flat surface which abuts the mixing chamber block 96, with a suitable gasket 150 between these blocks to prevent the water entering the mixing chamber 134 by seeping between a space between the mixing chamber block and the base block. Resting against the other surface of the mixing chamber block 96 is the water channel block 95 which includes a water delivery chamber 152 adjacent the spout 16 and a water exit channel 154 having a first leg 154a and a second leg 154b. The header block 94 includes a lip 156 which is seated over the flange 122 of the annular bushing 90, holding the annular bushing in place. There is a lip 160 on the upper end of the water channel block 95 which forms a cavity to receive the header block snugly therein. Thus, the assembly of the four blocks 94-97, when secured in position, provides a watertight structure that permits water to enter this assembly through the hot and/or cold water conduits 26 and 28 flowing through the hot and cold water inlets 136 and 138 into the mixing chamber 134. The hot water and cold water are mixed together in the desired ratio by controlling the position of the mixing element 92. As shown in FIG. 16 in solid lines, the mixing element is positioned so that there will be an equal amount of hot and cold water entering the mixing chamber 134. By turning the mixing element 94 in a clockwise direction, to move the element to the position shown in dotted lines, the cold water inlet is closed off and the hot is completely open. By rotating in a counterclockwise direction, the mixing element 94 is moved to close off the hot water inlet and completely open the cold water inlet.

When the control knob 94 is depressed, the solenoid valve 80 is actuated to pull in its plunger 160. This permits water to flow from the mixing chamber 134 through the exit channel 154 into the delivery chamber 152, through a flow control valve 162 and out the spout 16. First the water flows out the mixing chamber 134, through the first leg 154a of the exit channel 154 past a gap 164 between the water channel block 95 and the plunger 160, and into the second leg 154b of the water exit channel. When the plunger 160 is again depressed, it will close off the inlet to the second leg 154b, preventing water flowing through this leg and out the spout 16.

The flow control valve 162 used in this system is situated in the space between a wall 166 and the outlet of the spout 16. A disk 168, with an orifice 170 therein, is disposed between the flow control valve 162 and the outlet of the spout, resting in a recess provided between the wall surrounding the outlet of the spout and the exterior wall of the water channel block 95. As best shown in FIGS. 18 and 19, the flow control valve is made of a rubber material and has an annular configuration, with a central opening 172 therein extending from the delivery chamber 152 to an enlarged conical section 173. The opening 172 in the valve 162 is aligned with the orifice 170 in the disk 168. The valve 162 is designed to flex when pressure is applied to its rear wall, depressing it as shown in FIG. 19 to close off the inlet end of the opening 172. As water pressure is decreased the valve returns to its normal condition shown in FIG. 18, opening the inlet end allowing more water to flow through the valve. Thus, the valve 162 provides for self regulation, increasing the flow of water when the pressure is reduced and decreasing the flow of water when the pressure is increased to maintain water flow relatively constant.

Figure 20:
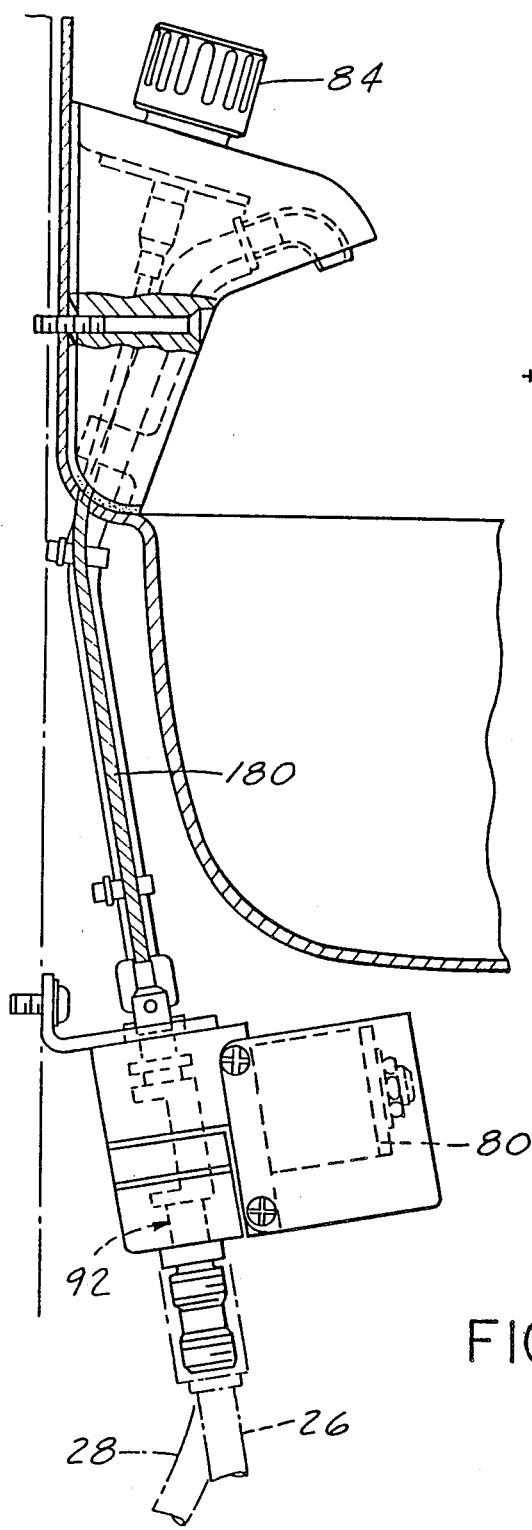
FIG. 20 is a side elevational view partially in cross-section of a fourth embodiment of this invention.

A fourth embodiment of this invention is illustrated in FIG. 20 wherein the control knob 84 is connected to the mixing element 92 through a flexible shaft 180, with the mixing element 92 being mounted remote from the control knob. This is desirable where space is not available immediately behind the washbasin and faucet assembly. Depression of the knob will, as before, result in actuation of the solenoid valve 80 to open it causing water to flow from the spout.

OPERATION

Figure 21:
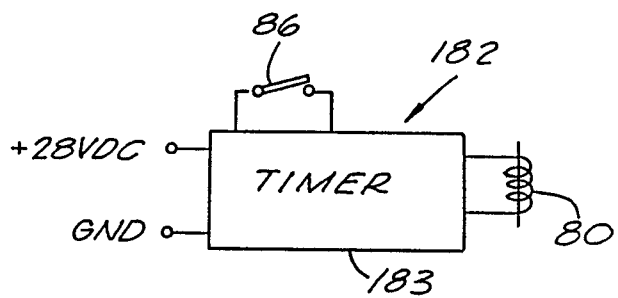
FIG. 21 is a control circuit for the flow control valve shown in FIGS. 8 through 20.

The operation of the different embodiments of this invention are best understood in connection with the discussion of the control circuits shown in FIGS. 5A, 5B and 21.

The embodiments shown in FIGS. 1 through 7 are designed to operate in at least two different modes. These modes are illustrated schematically by FIGS. 5A and 5B. Each of the embodiments illustrated in FIGS. 1 through 6 includes a timer connected to the solenoids 22 and 24 and actuated by the closure of either switch 42 or switch 44. The timer is of conventional design and will cycle the solenoids through different series of operations, depending upon whether the two switches are open and closed within a predetermined arbitrary time established by the requirements of individual aircraft. The two following examples illustrate this feature of the invention.

Figure 22:
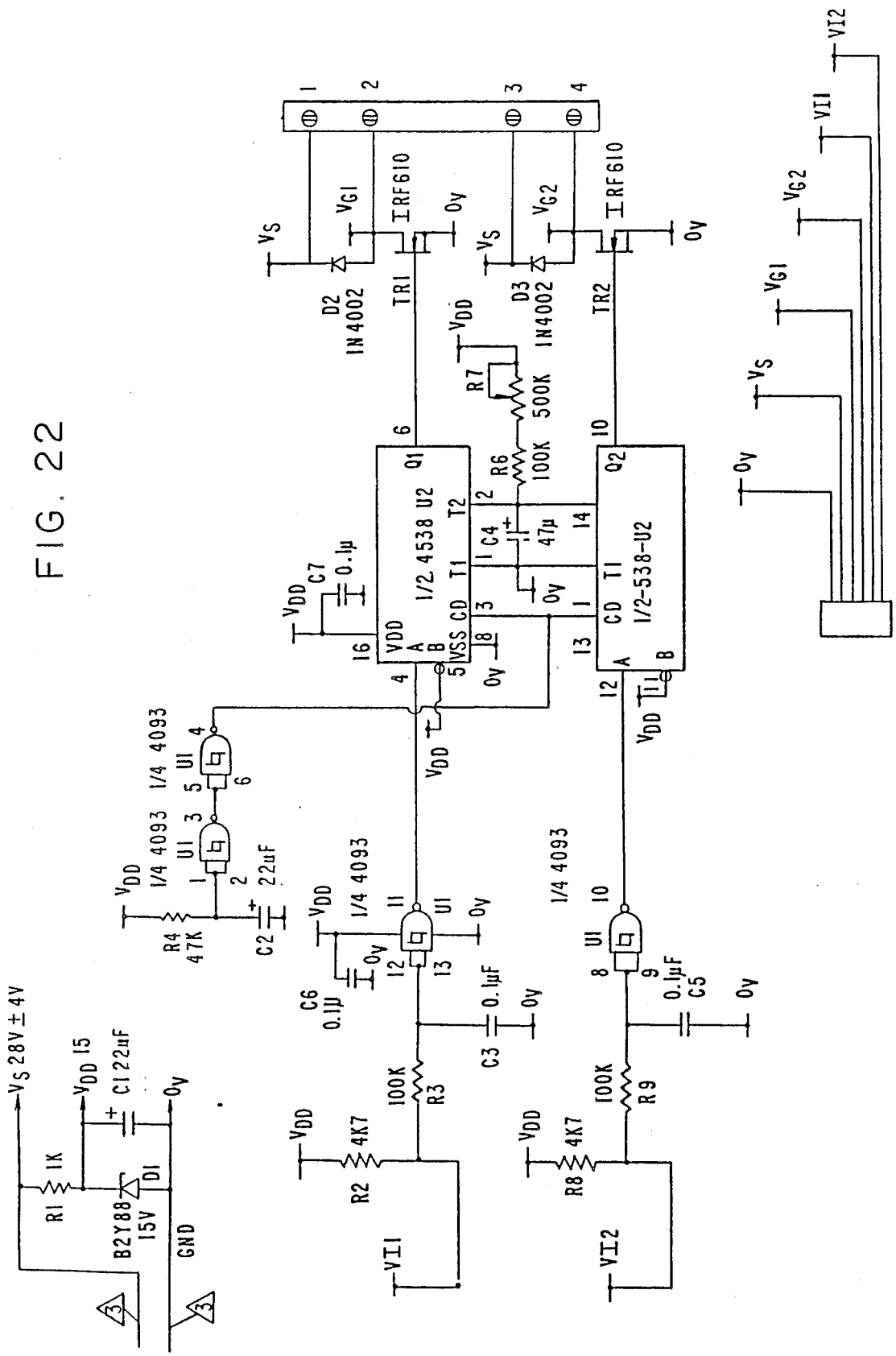
FIG. 22 represents the control circuitry for the embodiment schematically illustrated at FIG. 5A.

In the first example, illustrated in FIG. 5A, (see FIG. 22 for details) the timer 51 is designed to operate the solenoid valves for a 10 second time period. When either of the switches 42 or 44 is actuated, its corresponding solenoid valve will be opened, allowing either hot or cold water to flow from the faucet 14. If during this 10 second time interval the second switch is actuated, then the 10 second time interval is reset so that water will flow past both solenoid valves for a 10 second interval. Equal volumes of water will flow through these two solenoid valves 22 and 24 to provide a mixture of hot and cold water. If only one of the switches 42 or 44 is actuated during the 10 second interval, only one solenoid valve will be opened.

Figure 23:
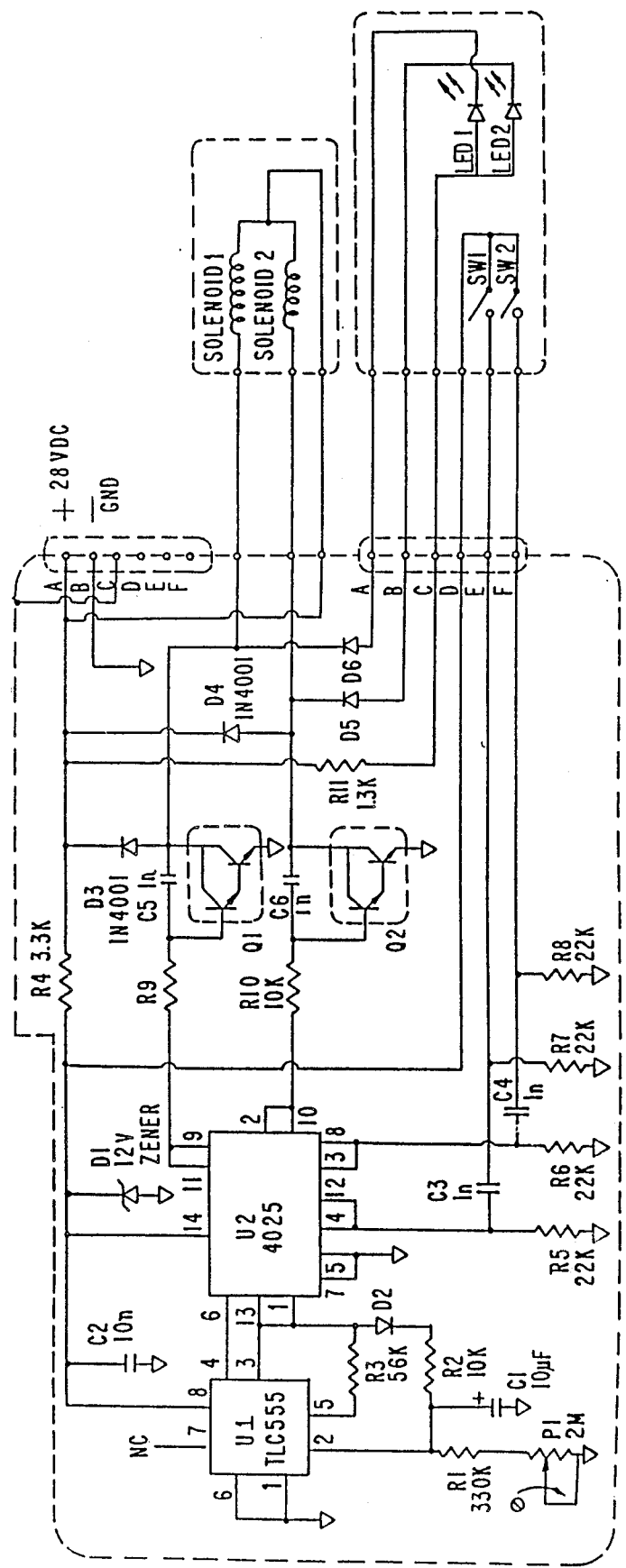
FIG. 23 represents the control circuitry for the embodiment schematically illustrated at FIG. 5B.

In the second example illustrated in FIG. 5B, (see FIG. 23 for details) only one solenoid will be opened for the preset time interval of 10 seconds. In this case, if switch 44 is closed, the valve 24 will be opened and only cold water will flow from the faucet. If during the ten second interval switch 42 is closed, switch 44 will open and only solenoid 22 will be energized allowing hot water to flow from the faucet. Thus, only hot or cold water wil flow from the faucet 14. Again a conventional timer is employed to accomplish this result.

The embodiments illustrated in FIGS. 7 through 20 are designed to adjust the relative ratio of hot and cold water and use a single solenoid valve to control the water flow. The control circuit 182 for these embodiments is shown in FIG. 21. In these embodiments the control knob 84 is turned either clockwise or counterclockwise to adjust the mixing control element 92 as illustrated in FIGS. 16 and 17 to set the ratio of hot and cold water flowing from the faucet. When this adjustment has been made, the control knob 84 is pushed downwardly to actuate the switch 86. Actuation of the switch 86 energizes the solenoid 80 to move its plunger 160 inwardly to allow water to flow out the water exit channel 154 through the flow control valve 162 out the spout 16. The timer 183 is turned on to maintain the solenoid 80 energized for a predetermined time period, for example, 10 seconds. After the time elapses, the solenoid is de-energized and the plunger 16 moves forward to close off the water exit channel 154, preventing water to flow from the spout 16.

SCOPE OF THE INVENTION

The above description presents the best mode contemplated in carrying out the present invention as depicted by the various embodiments disclosed. The combination of the features illustrated by these embodiments provide the user with an improved water dispensing system. This invention is, however, susceptible to both modifications and alternate constructions from the embodiments shown in the drawing and described above. Consequently, it is not the intention to limit it to the embodiments disclosed. On the contrary, the intention is to cover all modifications and alternate constructions falling within the scope of this invention as generally expressed by the following claims.

We claim:

1. A water dispensing system for an aircraft comprising:
   a water supply including a source of hot water and a source of cold water,
   vent means in communication with the water supply which closes upon the water supply being filled with water to allow the water to be pressurized and, when the aircraft is on the ground and being drained, vents the water supply to atmosphere,
   a washbasin and faucet combination, said faucet being disposed above the washbasin,
   conduit means between the faucet and water supply including a common channel which at one end is in communication with the faucet and at the other end is in communication with the source of hot water and the source of cold water, manually operable switch means for controlling the delivery of water from said water supply to the faucet, said switch means including a first switch controlling the operation of a first solenoid valve means for turning on the flow of hot water and a second switch controlling the operation of the second solenoid valve means for turning on the flow of cold water, said first and second solenoid valve means being coupled to timing control means for selectively controlling the timing cycle during which said first and second solenoid valve means are energized, the timing control means including means which, when one switch is actuated to energize one of the solenoid valve means and the other switch is also actuated during a predetermined period, resets the timing cycle so that both solenoid valve means are energized for the same length of time, and in said dispensing system, the water flowing from the faucet comprises approximately equal volumes of water from said source of hot water and said source of cold water.

2. A water dispensing system for an aircraft comprising:

a water supply including a source of hot water and a source of cold water, vent means in communication with the water supply which closes upon the water supply being filled with water to allow the water supply to be pressurized and, when the aircraft is on the ground and being drained, vents the water supply to atmosphere, a washbasin and faucet combination, the faucet being disposed above the washbasin, conduit means between the faucet and water supply including a common channel which at one end is in communication with the faucet and at the other end is in communication with the source of hot water and the source of cold water, manually operable switch means for controlling the delivery of water from the water supply to the faucet, switch means including a first switch controlling the operation of a first solenoid valve for turning on the flow of hot water and a second switch controlling the operation of a second solenoid valve means for turning on the flow of cold water, said first and second solenoid valve means being coupled to timing control means for selectively controlling the timing cycle during which said first and second valve means are energized, said timing control means including means which, when one switch is actuated for one of the solenoid valves means to energize initially one solenoid valve means and to initiate said timing cycle for said one solenoid valve means and the other switch is also actuated during said timing cycle, resets the timing cycle to stop the flow of water through said one solenoid valve means and start the flow of water through the other solenoid valve means for a predetermined time period.

* * * * *